United States Patent
Hsieh et al.

(10) Patent No.: US 10,671,313 B2
(45) Date of Patent: Jun. 2, 2020

(54) APPARATUS AND METHODS FOR FAST AND SECURE STORAGE OF DATA

(71) Applicant: Goke US Research Laboratory, Santa Clara, CA (US)

(72) Inventors: Kun-Lung Hsieh, Santa Clara, CA (US); Bo-Shian Hsu, Santa Clara, CA (US); Po-Chien Chang, Santa Clara, CA (US)

(73) Assignee: GOKE US RESEARCH LABORATORY, Santa Clara, CA (US)

( * ) Notice: Subject to any disclaimer, the term of this patent is extended or adjusted under 35 U.S.C. 154(b) by 25 days.

(21) Appl. No.: 15/877,567

(22) Filed: Jan. 23, 2018

(65) Prior Publication Data

US 2019/0227708 A1 Jul. 25, 2019

(51) Int. Cl.
*G06F 3/06* (2006.01)
*G06F 12/02* (2006.01)
*G06F 11/16* (2006.01)

(52) U.S. Cl.
CPC ............ *G06F 3/065* (2013.01); *G06F 3/0607* (2013.01); *G06F 3/0611* (2013.01); *G06F 3/0613* (2013.01); *G06F 11/1666* (2013.01); *G06F 12/0253* (2013.01); *G06F 2212/286* (2013.01)

(58) Field of Classification Search
CPC .... G06F 3/065; G06F 11/1666; G06F 3/0607; G06F 3/0613; G06F 3/0611; G06F 12/0253; G06F 2212/286
See application file for complete search history.

(56) References Cited

U.S. PATENT DOCUMENTS

| | | | | |
|---|---|---|---|---|
| 2011/0252187 A1* | 10/2011 | Segal | ................ | G06F 12/0246 711/103 |
| 2012/0198174 A1* | 8/2012 | Nellans | ............... | G06F 12/0804 711/133 |
| 2013/0046920 A1* | 2/2013 | Ryu | .................... | G06F 12/0246 711/103 |
| 2015/0356011 A1* | 12/2015 | Fu | ........................ | G06F 12/0895 711/118 |
| 2016/0321175 A1* | 11/2016 | Kobayashi | ............ | G06F 1/3275 |

* cited by examiner

*Primary Examiner* — Tasnima Matin
(74) *Attorney, Agent, or Firm* — Alan D. Kamrath; Karin L. Williams; Mayer & Williams PC

(57) ABSTRACT

A data storage apparatus includes a cache memory module and a NAND flash memory module including a cache memory mirror and a user data storage zone. The cache memory module is connected to the cache memory mirror via a path and electrically connected to the user data storage zone via another path. The cache memory module receives a write command that includes user data from a host, writes a copy of the user data into the user data storage zone in a write-back mode, and writes another copy of the user data cache memory mirror in a write-through mode. If some of the user data are lost from the cache memory module before they are written into the user data storage zone, the user data written in the cache memory mirror are copied and written into the cache memory module when the data storage apparatus is initiated again.

6 Claims, 3 Drawing Sheets

APPARATUS AND METHODS FOR FAST AND SECURE STORAGE OF DATA

BACKGROUND OF INVENTION

1. Field of Invention

The present invention relates to a data-storing apparatus and, more particularly, to a fast and secure data storage apparatus that uses a write-back mode and a write-through mode in a NAND flash memory.

2. Related Prior Art

A write-through mode is necessary in some cases. However, the write-through mode is slow in comparison with a write-back mode. Yet, in comparison with the write-back mode, the write-through mode entails low physical space utilization because the amount of bytes of a dirty buffer could be smaller than that of a page.

A typical solid-state drive ("SSD") includes a NAND flash memory and a cache memory. The solid-state drive often uses a write-back mode. That is, data are written into the cache memory, and flushed into the NAND flash memory from the cache memory when the amount of data in the cache memory reaches an integral multiple of that of a page. However, the data will be lost if power failure occurs during the flushing of the data into the NAND flash memory from the cache memory. In some cases, such loss of data is intolerable, and a write-through mode must be used instead of the write-back mode in these cases. That is, data is flushed into the NAND flash memory for every write command.

As mentioned above, data is flushed into the NAND flash memory for every write command in the write-through mode. However, the write-through mode achieves security at the expense of performance (speed, in particular) and physical space utilization. The throughput of the solid-state drive is low because it takes the time needed for programming a page to program data less than a page. The write-amplification factor ("WAF") is high because dummy data are often written into pages of the NAND flash as required in the write-through mode. The total bytes written ("TBW") is reduced considerably.

The present invention is therefore intended to obviate or at least alleviate the problems encountered in prior art.

SUMMARY OF INVENTION

It is the primary objective of the present invention to provide a fast and secure data storage apparatus.

To achieve the foregoing objective, the data storage apparatus includes a cache memory module and a NAND flash memory module including a cache memory mirror and a user data storage zone. The cache memory module is connected to the cache memory mirror via a path and electrically connected to the user data storage zone via another path. The cache memory module receives a write command that includes user data from a host, writes a copy of the user data into the user data storage zone in a write-back mode, and writes another copy of the user data to the cache memory mirror in a write-through mode. If some of the user data are lost from the cache memory module before they are written into the user data storage zone, the user data written in the cache memory mirror are copied and written into the cache memory module when the data storage apparatus is initiated again.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
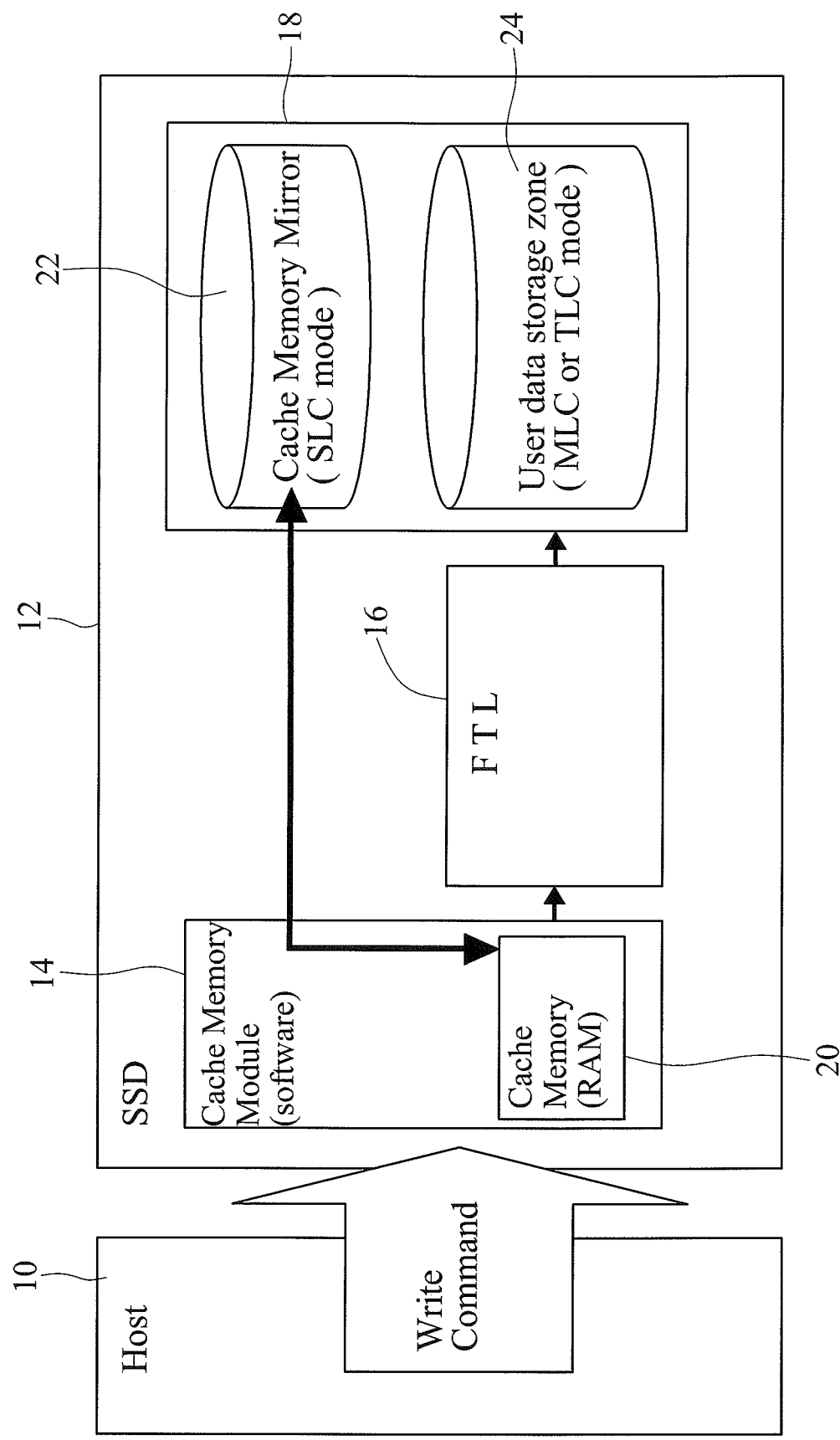
FIG. 1 is a block diagram of a fast and secure data storage apparatus according to the preferred embodiment of the present invention.

Referring to FIG. 1, a host 10 is electrically connected to a data storage apparatus 12. Data storage apparatus 12 is a solid-state drive that includes a cache memory module 14, a flash translation layer 16 and a NAND flash memory module 18 according to the preferred embodiment of the present invention.

Cache memory module 14 includes at least one cache memory 20 and other components that are not shown.

NAND flash memory module 18 includes a cache memory mirror 22 and a user data storage zone 24. In specific, NAND flash memory module 18 is configured to include a cache memory mirror 22 and a user data storage zone 24. Cache memory mirror 22 is programmed to operate in an SLC mode, thereby rendering the operation thereof fast. The space for storage of data in cache memory mirror 22 is not big, thereby rendering data storage apparatus 12 inexpensive. User data storage zone 24 is programmed to operate in a MLC (preferably TLC) mode that is inexpensive.

Cache memory module 14 is electrically connected to cache memory mirror 22 via a first path. Cache memory module 14 is electrically connected to user data storage zone 24 via a second path. In specific, cache memory 20 of cache memory module 14 is electrically connected to user data storage zone 24 via flash translation layer 16 in the second path.

In operation, host 10 sends a write command that includes user data to cache memory module 14 of data storage apparatus 12. Cache memory module 14 writes a copy of the user data into cache memory 20, and writes another copy of the user data into cache memory mirror 22. The two copies of the user data are written in a same sequence. The user data are written into cache memory mirror 22 from cache memory module 14 in a write-through mode. The user data are written into user data storage zone 24 from cache memory 20 via flash translation layer 16 in a write-back mode. The user data are stored in cache memory 20 temporarily. The user data are flushed into user data storage zone 24 from cache memory 20 via flash translation layer 16 when the amount of the user data stored in cache memory 20 reaches an integral multiple of the page size of NAND flash memory module 18. If power failure occurs before all of the user data are transferred to user data storage zone 24 from cache memory 20, the user data stored in cache memory mirror 22 are copied and transferred to cache memory 20 when data storage apparatus 12 is initiated again. Then, data storage apparatus 12 repeats the above-mentioned process. Hence, the operation of data storage apparatus 12 is fast and secure. The operation of data storage apparatus 12 is fast because the user data are written into user data storage zone 24 from cache memory 20 via flash translation layer 16 in the write-back mode. The operation of data storage apparatus 12 is secure because a copy of the user data is stored in cache memory mirror 22 temporarily, and can be written into cache memory 20, if necessary, to restore the normal operation, without having to lose any of the user data.

Figure 2:
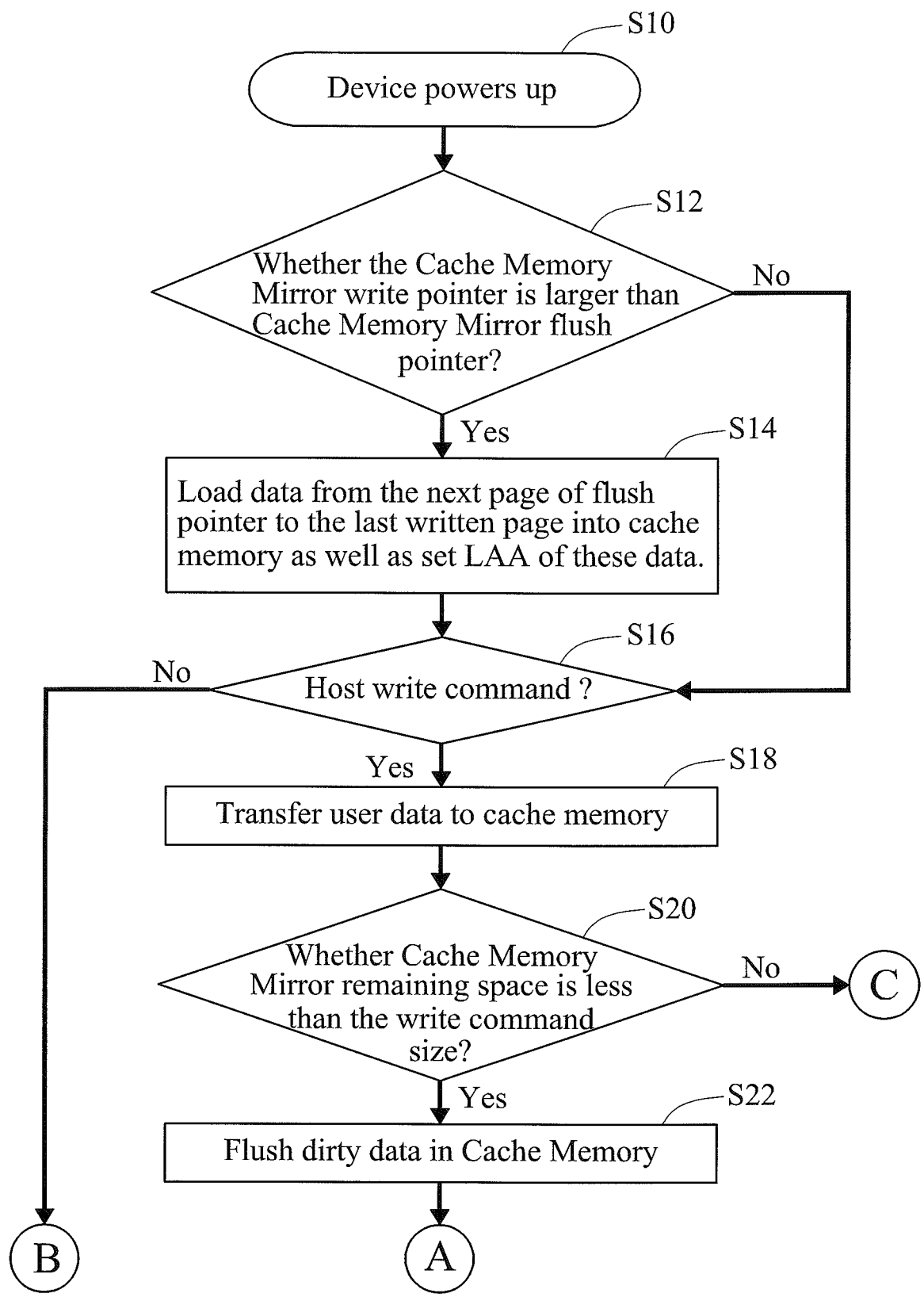
FIG. 2 is a flow chart of a portion of a method for operating the fast and secure data storage apparatus shown in FIG. 1.
Figure 3:
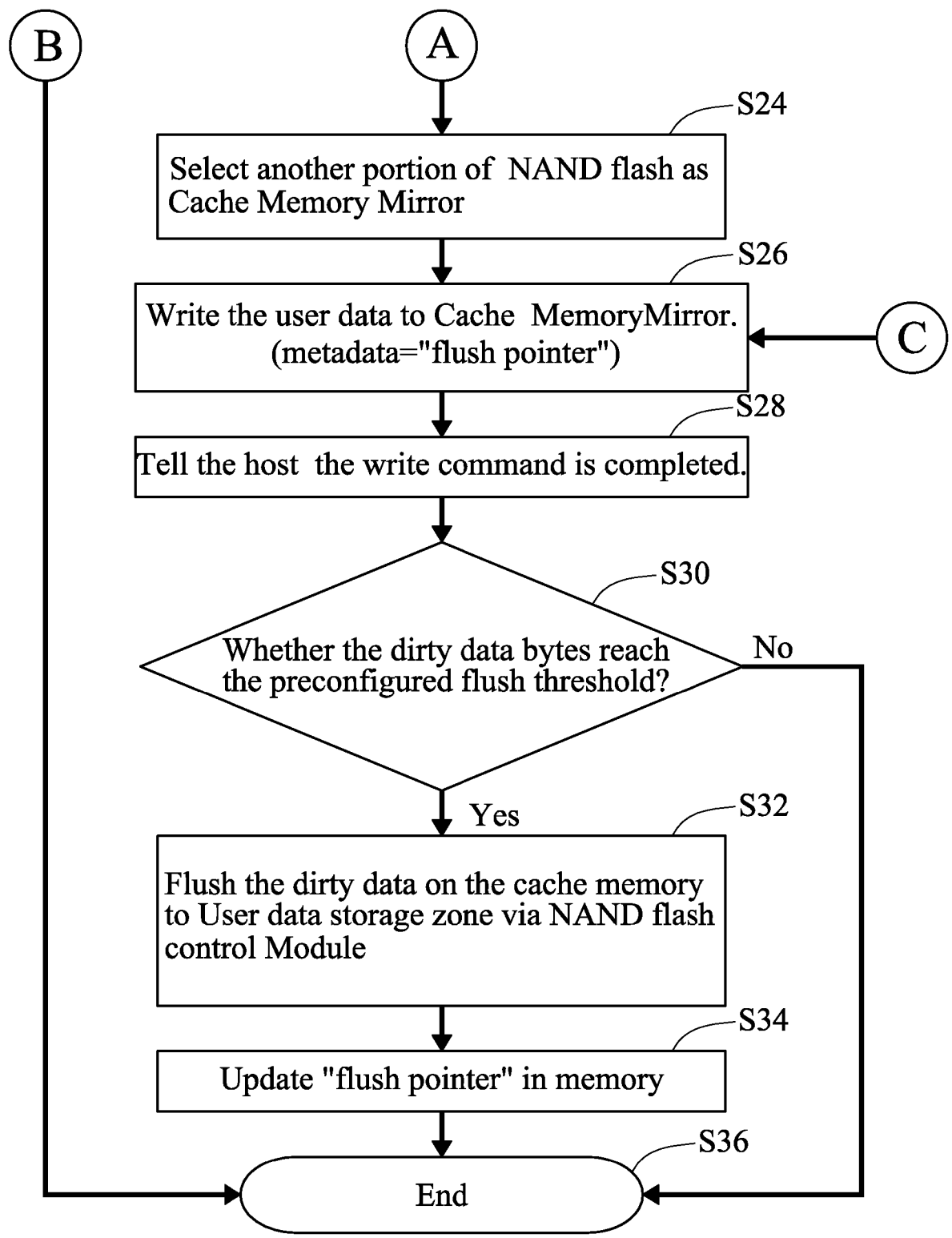
FIG. 3 is a flow chart of another portion of the method shown in FIG. 2.

Referring to FIGS. 2 and 3, a method for operating data storage apparatus 12 according to the preferred embodiment of the present invention will be described.

At S10, data storage apparatus 12 is initiated.

At S12, every time data storage apparatus 12, it determines whether if a write pointer of a last page of the user data stored in cache memory mirror 22 is larger than a flush pointer. Each page of the user data includes metadata. According to the present invention, the metadata are configured to include the write pointer and the flush pointer. Data storage apparatus 12 finds the last page of the user data written in cache memory mirror 22, and determines whether if a physical allocation address ("PAA") of the write pointer of the metadata is larger than that of the flush pointer. The process goes to S14 if the write pointer is larger than the flush pointer, or goes to S16 if otherwise.

At S14, a page that follows the page represented by the flush pointer to a last page are transferred into cache memory module 14, and given logical allocation addresses ("LAA"). For example, the write pointer is 7, and the flush pointer is 4. That the write pointer is 7 means pages 1 to 7 of the user data are stored in cache memory mirror 22 temporarily. That the flush pointer is 4 means pages 1 to 4 of the user data have been flushed into user data storage zone 24 from cache memory 20. Pages 5 to 7 of the user data have not been stored in user data storage zone 24. Hence, pages 5 to 7 of the user data are transferred into cache memory module 14 from cache memory mirror 22. Then, cache memory module 14 transfers pages 5 to 7 of the user data into cache memory 20 via an internal path.

At S16, it is determined whether if host 10 gives a write command that includes user data. The process goes to S18 if host 10 gives a write command, or goes to S36 if otherwise.

At S18, host 10 transfers the user data into cache memory module 14.

At S20, it is determined whether if the size of the space for storage of data left in cache memory mirror 22 is smaller than the size of the write command. The process goes to S22 if the size of the space for storage of data left in cache memory mirror 22 is smaller than the size of the write command, or goes to S26 if otherwise.

At S22, dirty data are flushed into user data storage zone 24 from cache memory 20. The dirty data are some of the user data that have not been flushed into user data storage zone 24 from cache memory 20.

At S24, another portion of NAND flash memory module 18 is selected and used as cache memory 20.

At S26, the user data are written into cache memory mirror 22 from cache memory module 14.

At S28, data storage apparatus 12 tells host 10 that the write command has been executed.

At S30, it is determined whether if the amount of bytes of the dirty data stored in cache memory 20 reaches a predetermined threshold. The process goes to S32 if the amount of bytes of the dirty data stored in cache memory 20 reaches a predetermined threshold, or goes to S36 if otherwise.

At S32, the dirty data are flushed into user data storage zone 24 from cache memory module 14 via flash translation layer 16.

At S34, the flush pointer is updated.

At S36, the process is finished. The process will be repeated if host 10 gives another write command.

The user data are written into user data storage zone 24 in the write-back mode. MLC or TLC, which is inexpensive, can be used as user data storage zone 24 due to the use of the write-back mode. The user data are written into user data storage zone 24 from cache memory module 14 in the write-back mode if no power failure occurs.

The user data are written into cache memory mirror 22 in the write-through mode. However, the writing of the user data into cache memory mirror 22 in the write-through mode is not slow because the cache memory mirror 22 is operated in the SLC mode and the writing of data into an SLC is inherently fast. Cache memory mirror 22 is a temporary storage zone. The user data will not be read from cache memory mirror 22 if no power failure occurs during the writing of the user data. The user data will not be read from cache memory mirror 22 if no power failure occurs during the writing of the user data.

Data storage apparatus 12 includes several advantageous features. Firstly, solid-state drive writes the user data into cache memory mirror 22 according to each write command from host 10, and cache memory mirror 22 is part of NAND flash memory module 18.

Secondly, cache memory mirror 22 is programmed to operate in the SLC mode.

Thirdly, data storage apparatus 12 writes the flush pointer in a spare area of each page of the user data stored in cache memory mirror 22. The flush pointer represents the last PAA of the user data in cache memory mirror 22 before they are flushed.

Fourthly, the sequence by which the dirty data are flushed into user data storage zone 24 from cache memory 20 is called "flush sequence." The sequence by which the same data are written into cache memory mirror 22 is called "write sequence." The flush sequence must be identical to the write sequence.

Fifthly, data storage apparatus 12 updates the flush pointer every time it flushes the dirty data into user data storage zone 24 from cache memory module 14.

Sixthly, data storage apparatus 12 determines whether if the same user data as those stored in the cache memory mirror 22 have been flushed into user data storage zone 24 every time data storage apparatus 12 is initiated. Data storage apparatus 12 has to rebuild those user data that have been lost from cache memory 20 and not flushed into user data storage zone 24.

Seventhly, cache memory 20 sets the PAA for those user data.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A data storage method comprising the steps of:
   providing a data storage apparatus with a cache memory module and a NAND flash memory module, wherein the cache memory module comprises a cache memory;
   selecting a portion of the NAND flash memory module as a cache memory mirror;

selecting another portion of the NAND flash memory module as a user data storage zone;
transferring a write command that comprises user data into the cache memory module from a host;
writing a copy of the user data into the user data storage zone from the cache memory module in a write-back mode;
writing another copy of the user data into the cache memory mirror from the cache memory module in a write-through mode;
determining whether any of the user data are lost from the cache memory module before all of the user data are written into the user data storage zone comprising the steps of:
  setting a write pointer for every page of the user data stored in the cache memory mirror;
  setting a flush pointer for every page of the user data stored in the cache memory mirror;
  determining whether the write pointer is larger than the flush pointer; and
  updating the flush pointer every time the user data are written into the user data storage zone from the cache memory module; and
copying the user data stored in the cache memory mirror and writing the user data into the cache memory module which then writes the user data into the user data storage zone in the write-back mode when the data storage apparatus is rebooted if some of the user data are lost from the cache memory module before all the user data are written into the user data storage zone.

2. The data storage method according to claim 1, wherein the step of copying the user data stored in the cache memory mirror and writing the user data into the cache memory module comprising the steps of:
  writing a page that follows the page represented by a flush pointer to a last page into the cache memory module from the cache memory mirror; and
  setting logical allocation addresses for the user data.

3. The data storage method according to claim 1, wherein the step of transferring a write command that comprises user data into the cache memory module from a host comprises the steps of:
  determining whether the host gives a write command;
  transferring the user data into the cache memory module from host if the host gives a write command; and
  stopping the process if the host does not give a write command.

4. The data storage method according to claim 1, wherein the step of writing another copy of the user data into the cache memory mirror from the cache memory module in a write-through mode comprises the steps of:
  determining whether the size of space for storage of data left in the memory mirror is smaller than that of the write command;
  if the size of space for storage of data left in the memory mirror is smaller than that of the write command, executing the steps of:
    flushing the user data into the user data storage zone from the cache memory; and
    selecting another portion of the NAND flash memory module as the cache memory mirror.

5. The data storage method according to claim 1, wherein the step of writing the user data into the cache memory mirror from the cache memory module further comprising the step of telling the host that the user data have been written into the cache memory mirror from the cache memory module.

6. The data storage method according to claim 1, wherein the step of writing another copy of the user data into the user data storage zone from the cache memory module in the write-back mode comprises the steps of:
  determining whether an amount of dirty data reaches a predetermined value; and
  flushing the user data into the user data storage zone from the cache memory module and updating the flush pointer if the amount of the dirty data reaches the predetermined value.

* * * * *